(12) United States Patent
Martin et al.

(10) Patent No.: US 12,273,387 B1
(45) Date of Patent: *Apr. 8, 2025

(54) SYSTEM AND METHOD FOR MONITORING COMPUTING SERVERS FOR POSSIBLE UNAUTHORIZED ACCESS

(71) Applicant: 8x8, Inc., Campbell, CA (US)

(72) Inventors: Bryan Martin, Campbell, CA (US); Zhishen Liu, Campbell, CA (US); Qing Zhao, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/365,901

(22) Filed: Jul. 1, 2021

Related U.S. Application Data

(63) Continuation of application No. 16/571,857, filed on Sep. 16, 2019, now Pat. No. 11,057,436, which is a (Continued)

(51) Int. Cl.
*H04L 29/06* (2006.01)
*H04L 9/40* (2022.01)

(52) U.S. Cl.
CPC ............ *H04L 63/20* (2013.01); *H04L 63/102* (2013.01); *H04L 63/1408* (2013.01); *H04L 63/1433* (2013.01)

(58) Field of Classification Search
CPC ... H04L 63/20; H04L 63/102; H04L 63/1408; H04L 63/1433
See application file for complete search history.

(56) References Cited

U.S. PATENT DOCUMENTS 7,428,234 B2 * 9/2008 Forte-McRobbie ........................ H04L 65/1069
370/352
7,447,159 B1 11/2008 Croak
(Continued)

FOREIGN PATENT DOCUMENTS

WO 996042041 A2 12/1996

OTHER PUBLICATIONS

D. Butcher et al., "Security challenge and defense in VoIP infrastructure", IEEE, 2007, pp. 1152-1162.
(Continued)

*Primary Examiner* — Mohammad A Siddiqi
(74) *Attorney, Agent, or Firm* — Crawford Maunu PLLC

(57) ABSTRACT

A system is provided that includes one or more computing servers and a processing circuit for analyzing data transactions of the computing servers. Each of the computing servers is configured to provide respective services to remote users. The processing circuit is configured to analyze data transactions of at least one of the computing servers, which is associated with a user account. A security policy of the user account includes conditions that are indicative of unauthorized access when the conditions are satisfied by various characteristics of the analyzed data transactions. The processing circuit is configured to determine a threat level as function of the characteristics of the data transactions and the conditions of the security policy. In response to the threat level exceeding a threshold level indicated in the security policy of the user account, the processing circuit performs an action for the user account that is associated with the threshold level.

19 Claims, 4 Drawing Sheets

Related U.S. Application Data continuation of application No. 15/785,697, filed on Oct. 17, 2017, now Pat. No. 10,419,491, which is a continuation of application No. 15/074,147, filed on Mar. 18, 2016, now Pat. No. 9,794,293, which is a continuation of application No. 14/107,656, filed on Dec. 16, 2013, now Pat. No. 9,300,679.

(56) References Cited

U.S. PATENT DOCUMENTS

| | | | |
|---|---|---|---|
| 7,773,727 B1 * | 8/2010 | Eslambolchi | H04M 3/10 |
| | | | 379/112.01 |
| 8,874,120 B1 | 10/2014 | Tian | |
| 9,300,679 B1 | 3/2016 | Martin et al. | |
| 9,794,293 B1 | 10/2017 | Martin et al. | |
| 10,419,491 B1 | 9/2019 | Martin et al. | |
| 2002/0184575 A1 | 12/2002 | Landan | |
| 2003/0059018 A1 * | 3/2003 | Eber | H04M 3/54 |
| | | | 379/211.02 |
| 2003/0128692 A1 | 7/2003 | Mitsumori et al. | |
| 2004/0028032 A1 | 2/2004 | Rantanen | |
| 2004/0162781 A1 | 8/2004 | Searl et al. | |
| 2005/0052996 A1 * | 3/2005 | Houck | H04L 65/1043 |
| | | | 370/352 |
| 2007/0280211 A1 | 12/2007 | Malueg et al. | |
| 2008/0056478 A1 | 3/2008 | Huynh | |
| 2008/0080376 A1 | 4/2008 | Adhikari et al. | |
| 2008/0181140 A1 | 7/2008 | Bangor et al. | |
| 2009/0007220 A1 * | 1/2009 | Ormazabal | H04L 63/107 |
| | | | 706/14 |
| 2009/0013078 A1 | 1/2009 | Bencheikh | |
| 2009/0116634 A1 * | 5/2009 | Levin | H04M 7/121 |
| | | | 379/221.01 |
| 2009/0135727 A1 | 5/2009 | Agrawal et al. | |
| 2009/0138239 A1 | 5/2009 | Golani et al. | |
| 2009/0144413 A1 | 6/2009 | Khan et al. | |
| 2009/0288165 A1 | 11/2009 | Qiu et al. | |
| 2009/0304165 A1 | 12/2009 | Chung | |
| 2010/0091671 A1 | 4/2010 | Lidstrom et al. | |
| 2011/0055921 A1 | 3/2011 | Narayanaswamy et al. | |
| 2012/0311132 A1 | 12/2012 | Tychon et al. | |
| 2013/0055375 A1 | 2/2013 | Cline et al. | |
| 2013/0286861 A1 | 10/2013 | Smith et al. | |
| 2014/0022953 A1 | 1/2014 | Kumarasamy | |
| 2014/0036781 A1 | 2/2014 | Ohayon et al. | |
| 2014/0086073 A1 | 3/2014 | Baykal et al. | |
| 2014/0113600 A1 | 4/2014 | El Gamal et al. | |
| 2014/0140200 A1 | 5/2014 | Layman et al. | |
| 2014/0280992 A1 * | 9/2014 | Khan | H04L 67/143 |
| | | | 709/228 |
| 2015/0026786 A1 * | 1/2015 | Alexander | H04W 12/128 |
| | | | 726/7 |
| 2015/0029895 A1 | 1/2015 | Smelyansky | |
| 2015/0058058 A1 | 2/2015 | Shi et al. | |

OTHER PUBLICATIONS

W. S. Jeon et al., "Call admission control for mobile mulitmedia communications with traffic asymmetry between uplink and downlink", IEEE, 2001, pp. 59-66.

D. Sisalem et al. "Denial of Service Attacks Targeting a SIP VoIP Infrastructure: Attack Scenarios and Prevention Methods." IEEE, Oct. 2006, pp. 26-31.

* cited by examiner

US 12,273,387 B1

SYSTEM AND METHOD FOR MONITORING COMPUTING SERVERS FOR POSSIBLE UNAUTHORIZED ACCESS

FIELD OF THE INVENTION

The present disclosure relates to monitoring of computing servers.

OVERVIEW

Computing servers are increasingly being used to provide various services over a network including but not limited to, website hosting, remote data storage, remote computing services, virtual computing environments, communication services (e.g., voice-over-IP (VOIP), video conferencing, call exchange servers, packet switching, and traffic management). For ease of reference, the various applications, systems and services that may be provided by computing servers may be collectively referred to as remote services. In some applications, computing servers may use authentication mechanisms to prevent unauthorized access to user data, fee-based services, or account settings. However, authentication mechanisms may be bypassed using various computing exploits and/or social engineering techniques.

SUMMARY

Aspects of the present disclosure are directed to network applications that address challenges including those discussed above, and that are applicable to a variety of applications, devices, systems and methods. These and other aspects of the present disclosure are exemplified in a number of implementations and applications, some of which are shown in the figures and characterized in the claims section that follows.

According to one or more embodiments, a system is provided that includes one or more computing servers (e.g., VoIP servers) and a processing circuit, communicatively-coupled to the computing servers, for monitoring data transactions of the computing servers. Each of the computing servers is configured to provide respective remote services to remote users. The processing circuit is configured to analyzer (e.g., monitor) data transactions (e.g., VOIP calls) of at least one of the computing servers (e.g., a VoIP server), which is associated with a user account. A security policy of the user account includes a set of conditions that are indicative of unauthorized access when the conditions are satisfied by various characteristics of the monitored data transaction (e.g., frequency of data transactions, size of data transactions, files accessed, and/or cost of data transaction). The processing circuit is configured to determine a threat level based on the characteristics of the data transactions and the conditions of the security policy. In response to the threat level exceeding a first threshold level, indicated in the security policy of the user account, the processing circuit performs an action associated with the first threshold level, such as sending a notification to an authorized user of the user account.

BRIEF DESCRIPTION OF THE DRAWINGS

The invention may be more completely understood in consideration of the following detailed description of various embodiments of the invention in connection with the accompanying drawings, in which.

Figure 1:
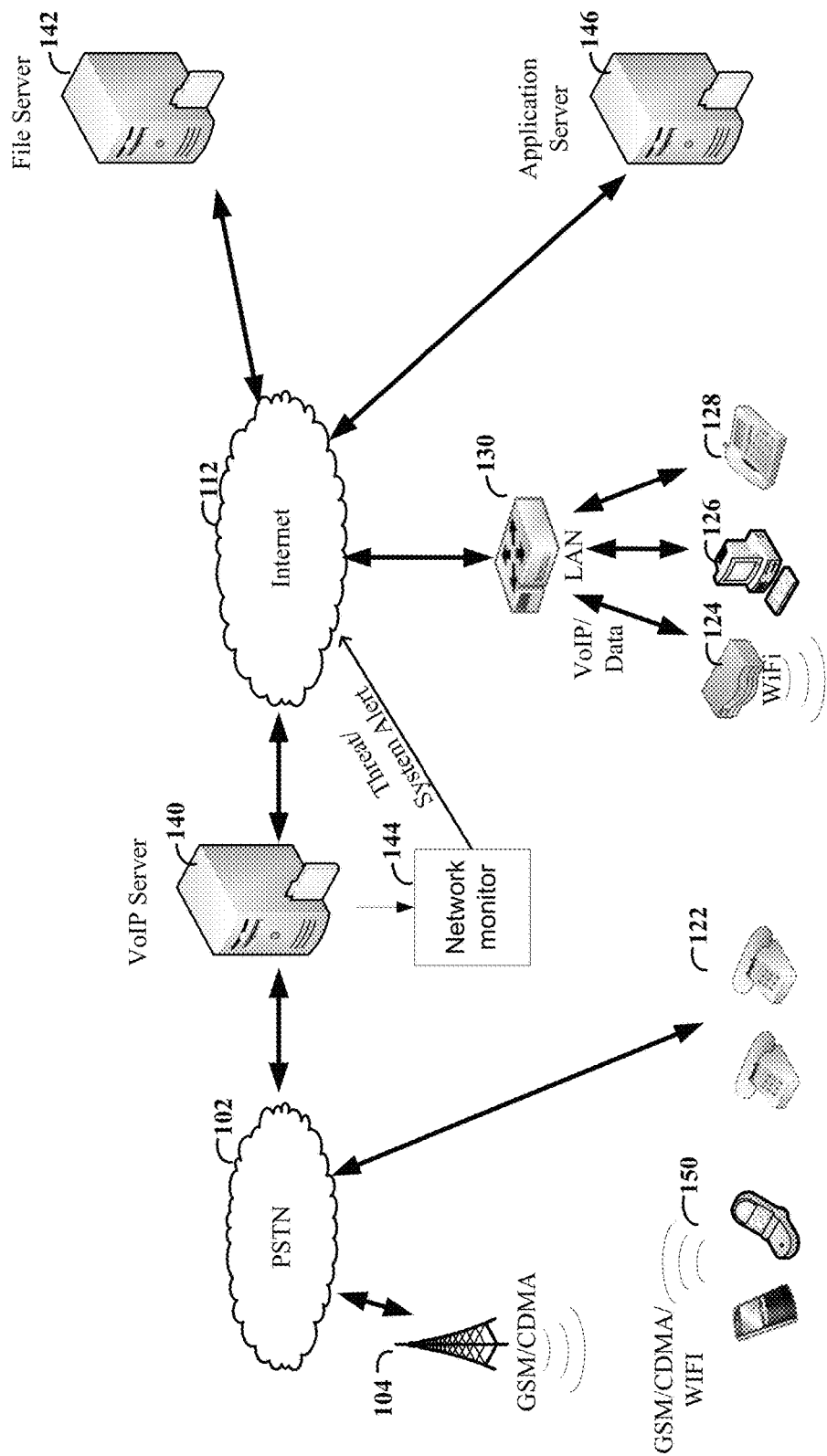
FIG. 1 shows an example network architecture with a cloud-based file server and application server.

While various embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure describes various systems and devices for monitoring computing servers and providing alerts in response to detecting possible unauthorized access. The disclosed embodiments are applicable to various different types of computing servers including, e.g., VOIP servers, file servers, email servers, web servers, and virtual computing services. For ease of explanation, the examples and embodiments herein are primarily described with reference to VoIP servers. While the disclosed embodiments are not necessarily limited to such applications, various aspects of the present disclosure may be appreciated through a discussion of various examples using this context.

In some disclosed embodiments, a system is provided that includes one or more VOIP servers and a processing circuit, communicatively-coupled to the one or more VoIP servers, for monitoring data transactions of the computing servers. Each of the VOIP servers is configured to provide respective remote services to remote users. The processing circuit is configured to monitor data transactions (e.g., VoIP calls and/or voice messaging accesses) of at least one of the VOIP servers, which is associated with a user account. A security policy of the user account includes a set of conditions that are indicative of unauthorized access when the conditions are satisfied by various characteristics of the monitored data transaction (e.g., frequency of data transactions, size of data transaction, files accessed, cost of data transaction, and/or flag in the data packet of the transaction). The processing circuit is configured to determine a threat level based on the characteristics of the data transactions and the conditions of the security policy. In response to the threat level exceeding a first threshold level indicated in the security policy of the user account, the processing circuit sends a notification to an authorized user of the user account.

The threat level may be determined based on a number of different aspects. For example, in one embodiment, the threat level is determined based on a number of the conditions that are satisfied in the security policy. In another embodiment, different conditions of a security policy are associated with respective threat levels. The threat level may be determined by determining the highest threat level of the conditions that are satisfied by the monitored data transactions. In another embodiment, the threat level is determined based on a level of sensitivity of files/services that are accessed by a data/transaction. In another embodiment, the threat level of data transactions depends on the direction of the data transactions. For instance, for voice-mail services provided by a VoIP server, unauthorized downloads of data (e.g., stored voice-mail messages) may pose a larger threat than unauthorized uploads of data. In contrast, in VOIP call services, unauthorized outgoing calls (which may incur long distance charges) pose a larger threat than unauthorized reception of incoming calls (in which charges do not apply).

In some embodiments, the processing circuit is further configured to monitor the data transactions and determine if characteristics of the data transactions are indicative of a system problem. For instance, in some implementations, characteristics indicative of a system problem may include excessive call jitter, dropped data packets, and/or network connectivity. In response to characteristics of the data transactions being indicative of a system problem, the processing circuit sends a notification to the authorized user of the user account and/or to a client associated with the monitored data transaction that indicated a system problem. In some implementations, in response to the monitored data transactions exhibiting characteristics indicative of a system problem, the processing circuit determines if the system problem is a server-side problem or a user-side problem. In response to determining that the system problem is a server-side problem, the processing circuit sends a notification to the authorized user of the user account. Conversely, in response to determining that the system problem is a user-side problem, the processing circuit sends a notification to a remote user corresponding to one of the monitored data transactions that was indicative of a system problem.

The processing circuit may provide the notification(s) of possible unauthorized access and/or system problems using a number of different types of messages. For instance, in some embodiments, the processing circuit is configured to provide an SMS text message notification to one or more telephone numbers indicated in the security policy. In some embodiments, the processing circuit is configured to send an automated voice call to the telephone number(s). In some embodiments, the processing circuit is configured to send an email notification to an email address indicated in the security policy. In some embodiments, notifications are provided using other messaging services (e.g., Facebook, MySpace, Twitter, and/or Instant Messengers). In some implementations, multiple notifications are sent to multiple recipients and/or use multiple types of messages.

In some embodiments, notifications may be provided in real time as instances of unauthorized access and/or system problems are detected. Some other embodiments avoid generating an overly burdensome number of notifications by filtering notifications based on the frequency or number of the notifications. For example, one implementation limits generation of notifications to a maximum frequency (e.g., one per hour) that is specified in the security policy. Each notification may summarize all instances of unauthorized access and/or system problems that have occurred since the last notification was sent. As another example, some embodiments limit the number of notifications generated per day to a number indicated in the security policy.

In some embodiments, the processing circuit is configured to perform a first set of actions listed in the security policy, in response to the threat level exceeding a first threshold, to mitigate effects of unauthorized access. For instance, in response to the threat level exceeding a threshold, the processing circuit may block one or more users or disable one or more remote services provided by the VoIP server. In some embodiments, the processing circuit may be configured to perform a second set of actions in response to the threat level exceeding a second threshold. For instance, the processing circuit may only alert an account manager in response to the threat level reaching a lower threshold and disable the VOIP server in response to the threat level reaching a higher threshold.

In one or more embodiments, the notification that is sent to an authorized user is configured to provide a mechanism for a user to select from one or more possible actions. For instance, in one implementation, an email or SMS text message may include a web address link to a webpage from which a user may select an action to take. In another implementation, a user may select a desired action by responding to an SMS text message with a text message indicating the selected action.

The security policy may be configured, based on user requirements, to include a number of different conditions to detect unauthorized access. For example, some conditions may detect possible unauthorized access based on frequency of data transactions. For instance, the security policy may include a condition that indicates unauthorized access may have occurred when the frequency of data transactions (e.g., number of transactions per hour) exceeds a threshold indicated in the security policy. This type of detection may be useful, for example, to detect call-loops between data carriers. In some implementations, the threshold is a fixed threshold. In some other implementations, the threshold adapts based on an average frequency of data transfers. For instance, the condition may be satisfied (indicate unauthorized access) when the frequency of data transactions surpasses a stored average for the account by a threshold amount indicated in the security policy.

As another example, some conditions may detect possible unauthorized access based on the size of the data transactions or total number of transactions. For instance, the security policy may include a condition that indicates unauthorized access may have occurred when the size of a data transaction exceeds a threshold transaction size in the security policy. Similarly, the security policy may include a condition that indicates unauthorized access may have occurred when a daily data transfer limit is exceeded. Conditions may place a data transfer limit on each user of a VoIP server or on the total amount of data transferred by a VoIP server.

In some embodiments, one or more conditions may detect possible unauthorized access based on the location of a user of the VOIP server. For instance, the security policy may include a condition that indicates unauthorized access may have occurred when a user logs into a monitored VOIP server from an IP address outside of an IP address range corresponding to a block of IP addresses. For example, a condition may indicate that a user is unauthorized if an IP address of a user is outside a block of IP addresses used by a company. As another example, a condition may indicate that a user is unauthorized if the IP address of the user indicates that the user is located outside of the country.

In some embodiments, possible unauthorized access may be indicated by flags set in one or more data packets of a data transaction. For instance, another data carrier may set flags in response to detecting possible call loops. When the call is forwarded to a VoIP server from the other data carrier, the flag can notify the VOIP server of the possible call loop. The VOIP server can further analyze the call to determine if a call loop has occurred and/or take remedial measures.

In some embodiments, one or more conditions detect possible unauthorized access using access control mechanisms (passwords, challenge questions, authentication keys). For instance, the security policy may include a condition that indicates unauthorized access may have occurred when a number of failed login attempts exceeds a limit indicated in the security policy.

The settings of a security policy (e.g., conditions for detecting unauthorized access, threshold levels, and actions to take in response to a threshold being reached) may be adjusted based on the requirements of the computing servers that are monitored. In some embodiments, the processing circuit is configured to provide a graphical user interface (GUI) that may be used to adjust settings of the security policy.

Turning now to the figures, FIG. 1 shows a telecommunication network including a plurality of computing servers (140, 142, 146), each configured to provide remote services to various end-point devices including, e.g., mobile devices 150, plain-old telephones (POTS) 122, computer(s) 126, IP phones 128. The computing servers may provide a variety of different remote services. In this example, the network includes a VoIP server 140, a file server 142, and an application server 146 (e.g., virtual machine service). Data transactions related to the remote services are communicated between the computing servers and the remote users over various data networks including, e.g., the internet 112, public service telephone networks 102, and private data networks (e.g., LAN 130, WiFi network 124, and/or Private Branch Exchange servers (not shown)).

In this example, the VOIP server 140 is monitored by a processing circuit(s) (e.g., network monitor 144) which is communicatively-coupled thereto and configured to detect possible unauthorized access of the VOIP server. The communicative-coupling of the VOIP server 140 and network monitor 144 may include either a direct connection or an indirect connection having, e.g., multiple connections, relay nodes, and/or networks in a communication path between the VOIP server 140 and network monitor 144. The network monitor is configured to determine a threat level for the monitored server based on a set of conditions in a security polity that are indicative of unauthorized access. In response to the threat level reaching a threshold level indicated in the security policy, the network monitor sends a threat notification to an authorized user (e.g., an account manager) indicated in the security policy. As indicated above, the network monitor 144 processing circuit may provide the notification of possible unauthorized access using one or more different types of messages including, e.g., SMS text messages, email, voice recording, instant messaging, and/or social network messaging services.

Figure 2:
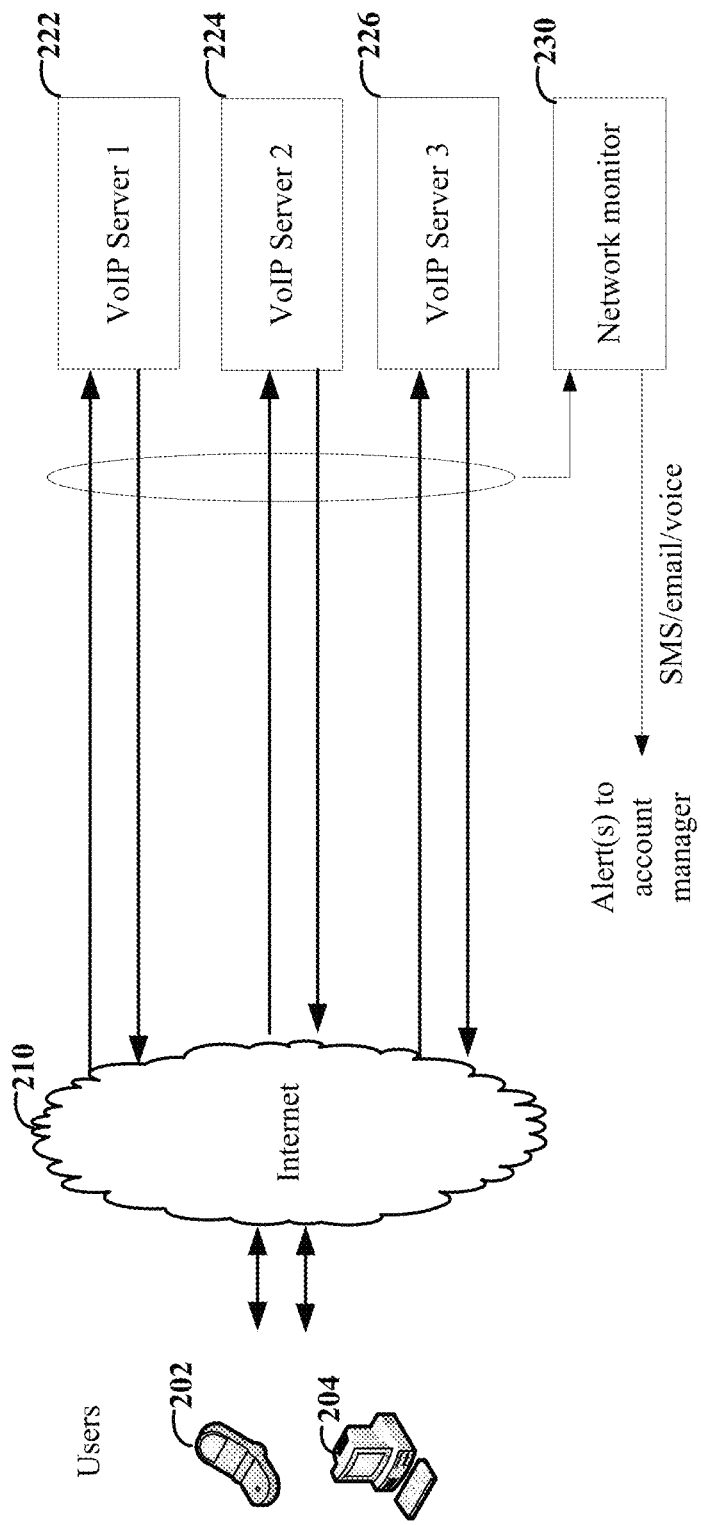
FIG. 2 shows an alert system configured in accordance with one or more embodiments of the present disclosure.

FIG. 2 shows an alert system configured in accordance with one or more embodiments of the present disclosure. In this example, the system includes a plurality of VOIP servers and a processing circuit (network monitor 230) for monitoring data transactions of the VOIP servers. Each of the VOIP servers is configured to provide respective VOIP services (e.g., VOIP calls, voice messaging, and/or VOIP conference recording/transcription) to remote users (e.g., 202 and 204). Data transactions of the services are communicated between the VOIP servers (222, 224, and 226) and the remote users (202 and 204) over one or more networks (e.g., internet 210). As described above, the network monitor 230 is configured to monitor data transactions of at least one of the computing servers, which is associated with a user account. In this example, the network monitor 230 is configured to monitor data transactions of three VoIP servers (222, 224, and 226). However, in various embodiments the network monitor may be configured to monitor any number of computing servers and/or different types of computing servers (providing different services). The VOIP servers (222, 224, and 226) and network monitor 230 may be implemented as different applications on the same computing processor, or may be implemented on separate processors and/or at different locations (e.g., in a cloud computing environment).

As described above, a security policy of the user account includes a set of conditions that are indicative of unauthorized access when the conditions are satisfied by various characteristics of the monitored data transaction (e.g., frequency of data transactions, size of data transaction, files accessed, and cost of data transaction). The network monitor is configured to determine a threat level, based on the characteristics of the data transactions and the conditions of the security policy. In response to the threat level exceeding a first threshold level indicated in the security policy of the user account, the network monitor provides a notification to an account manager (or other authorized user). As discussed with reference to FIG. 1, alerts may be provided to an account manager using a number of different types of messages including, e.g., SMS text messages, emails, voice recordings, instant messengers, and or social network messaging services.

Figure 3:
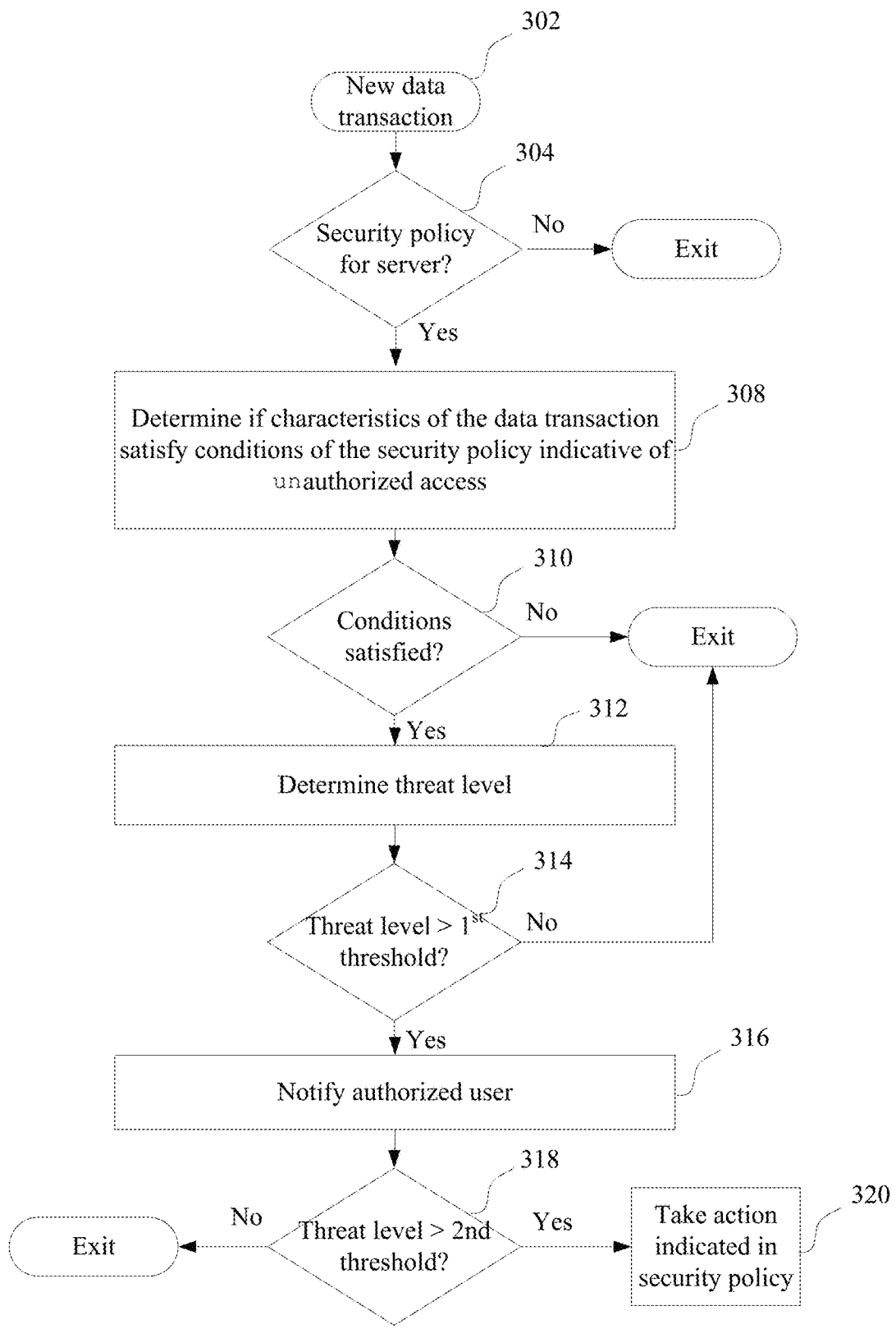
FIG. 3 shows an example process for monitoring a computing server for unauthorized access in accordance with one or more embodiments of the present disclosure.

FIG. 3 shows an example process for monitoring a VoIP server for unauthorized access in accordance with one or more embodiments of the present disclosure. In response to a new data transaction 302 to/from a VoIP server, it is first determined whether a security policy is associated with the corresponding VOIP server. If no security policy is associated with the VOIP server at decision step 304, the process exits. Otherwise, the process determines if characteristics of the data transaction satisfy conditions in the security policy at block 308. As indicated above, the conditions are indicative of possible unauthorized access when satisfied by the characteristics of the data transaction.

If no conditions of the security policy are satisfied at decision step 310, the process exits. Otherwise, if one or more conditions of the security policy are satisfied, a threat level is determined at block 312. The threat level may be determined based on a number of different aspects. For example, in one implementation, the threat level is determined based on a number of the conditions that are satisfied in the security policy and character. For instance, a larger number of conditions indicative of unauthorized access that are satisfied may indicate a greater threat. As another example, different conditions of a security policy may be associated with different threat levels. For instance, different conditions may have different likelihoods of being satisfied. Further, possible adverse effects of the types of unauthorized accesses indicated by the respective conditions may have differing levels of severity. In some embodiments, the threat level may be determined by determining the highest threat level of the conditions that are satisfied by the monitored data transactions. In another embodiment, the threat level is determined based on an aggregate of the threat levels of the satisfied conditions. In another embodiment, the threat level is determined based on a level of sensitivity of files/services that are accessed by a data/transaction. In another embodiment, threat level of data transactions depends on the direction of the data transaction. The threat level may be determined based on a combination of the above and other factors.

If the determined threat level is low enough at decision step 314, such that a first threshold of the security policy is not exceeded, the process exits. Otherwise, in response to the threat level exceeding the first threshold, a notification/alert is provided to an authorized user (e.g., account manager) at block 316. In some embodiments, the process automatically performs one or more actions in response to the threat level exceeding one or more threat levels. For instance, as shown in FIG. 3, in response to the threat level exceeding a second threshold, at decision block 318, the process performs one or more actions indicated in the security policy at block 320. In some embodiments, the process may perform additional actions in response to additional respective thresholds being exceeded by the determined threat level.

Figure 4:
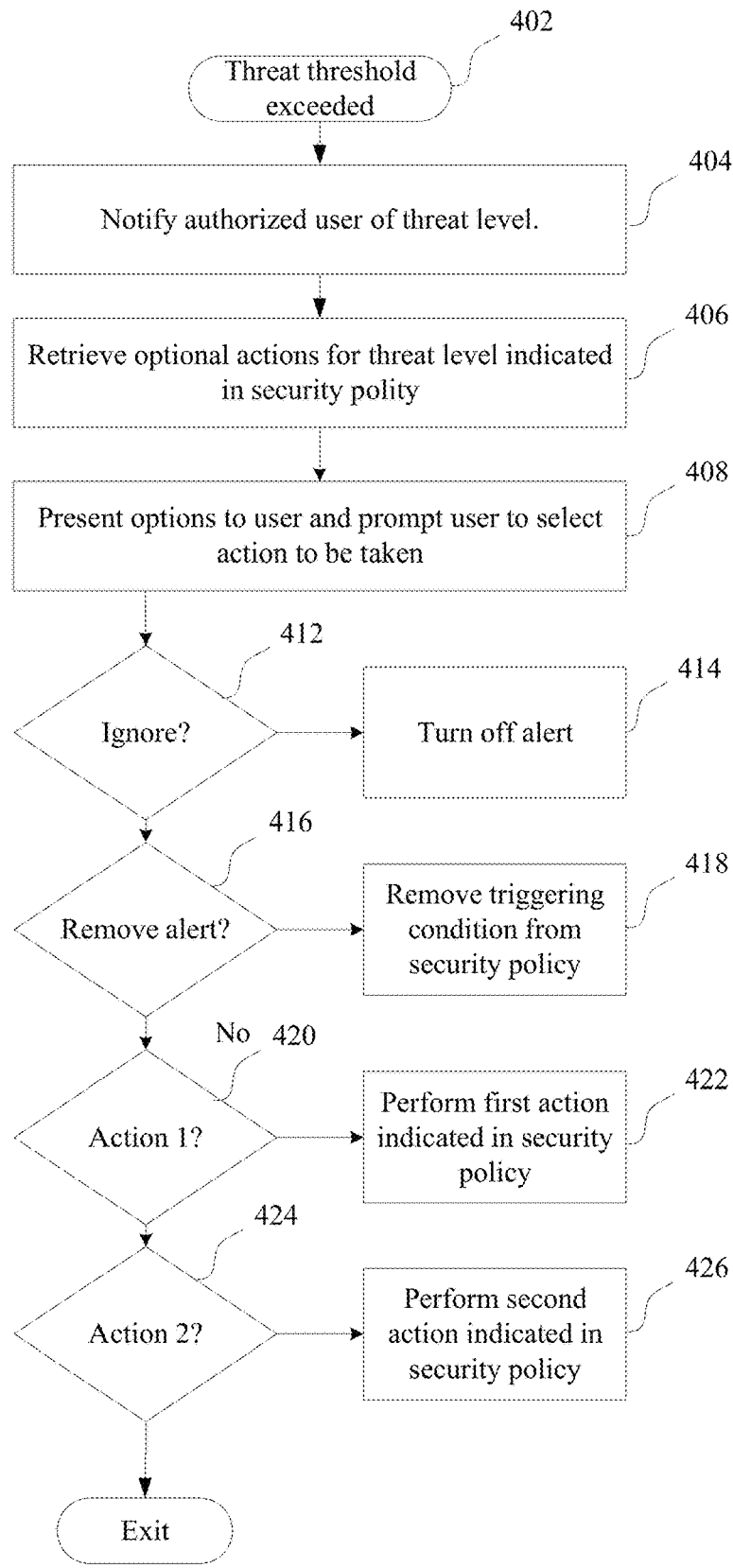
FIG. 4 shows an example process for providing an alert to an authorized user of a computing server account based on a threat level of the unauthorized access in accordance with one or more embodiments of the present disclosure.

FIG. 4 shows an example process for providing an alert to an authorized user of a VOIP server account based on the threat level of the unauthorized access in accordance with one or more embodiments of the present disclosure. In response to a threat threshold being exceeded by the determined threat level 402, an authorized user of the account is notified at block 404. As indicated above, notification may be performed using one or more different types of messages including, e.g., SMS text messages, email, voice recording, instant messaging, and/or social network messaging services.

In this example, optional actions that may be taken are retrieved from the security policy at block 406. The options are presented to a user and the user is prompted to select an action to be taken at block 408. For example, in some embodiments, the notification to the user may indicate the options and provide a mechanism for the user to select an action to be taken. For instance, in one implementation, options are presented in a text message and the desired action is selected by replying to the text message with one of a plurality of designated responses.

In the example shown in FIG. 4, a user is presented with four options (ignore, remove alert, action 1, or action 2). If the ignore option is selected by a user, at decision block 412, the alert is turned off at block 414 and the process exits. If the remove alert option is selected by a user, at decision block 416, the condition that triggered the alert is removed from the security policy. This option may be helpful to allow an account manager to use a default security policy and remove unnecessary conditions from the security policy as alerts are triggered. The security policy may also be configured to indicate a number of other actions (e.g., action 1 and action 2) that may be taken by a user in response to different threshold levels being exceeded. If action 1 is selected by a user, at decision block 420, a first action indicated in the security policy is performed at block 422. Similarly, if action 2 is selected by a user, at decision block 424, a second action indicated in the security policy is performed at block 426. If no action is selected by a user, the process exits.

The various embodiments as discussed herein may be implemented using a variety of structures and related operations/functions. For instance, one or more embodiments as described herein may be computer-implemented or computer-assisted, as by being coded as software within a coding system as memory-based codes or instructions executed by a computer processor, microprocessor, PC or mainframe computer. Such computer-based implementations are implemented using one or more programmable circuits that include at least one computer-processor and internal/external memory and/or registers for data retention and access. One or more embodiments may also be implemented in various other forms of hardware such as a state machine, programmed into a circuit such as a field-programmable gate array, or implemented using electronic circuits such as digital or analog circuits. In addition, various embodiments may be implemented using a tangible storage medium, which stores instructions that, when executed by a processor, performs one or more of the steps, methods or processes described herein (e.g., the processor is configured via the instructions). These applications and embodiments may also be used in combination; for instance, certain functions can be implemented using discrete logic (e.g., a digital circuit) that generates an output that is provided as an input to a processor.

The various embodiments described above are provided by way of illustration only and should not be construed to limit the invention. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features from another figure even though the combination is not explicitly shown or explicitly described as a combination. It is intended that the specification and illustrated embodiments be considered as examples only, with a true scope of the invention being indicated by the following claims.

What is claimed is:

1. A system comprising:
   a data communications server, including at least one Voice-over-Internet Protocol (VoIP) server, configured to provide to remote users respective various types of data communications services including data transaction calls associated with a user account; and
   a processing circuit communicatively-coupled to the data communications server and configured to:
      monitor at least some of the data transaction calls and determine therefrom that characteristics of said at least some of the data transaction calls indicate that said at least some of the data transaction calls are possibly unauthorized calls associated with a possible call loop;
      determine, in response to the indication of the possibly unauthorized calls, a threat level that corresponds to an actual call loop and that is determined at least in part in response to a flag provided as part of one or more data packets of a data transaction; and
      send a notification, in response to the threat level exceeding a configurable threshold level that is set and indicated in a security policy of a user account and that corresponds to said at least some of the data transaction calls being associated with the possible call loop, to an authorized user of the user account, wherein the threshold level is indicative of whether said at least some of the data transaction calls correspond to an actual call loop.

2. The system of claim 1, wherein the threshold level is based on an indication of frequency of data transfers or data transactions.

3. The system of claim 1, wherein the threshold level is associated with a possible unauthorized access to user data, fee-based services, or account settings.

4. The system of claim 1, wherein the threshold level is associated with the monitored data transaction calls exhibiting characteristics indicative of a system problem.

5. The system of claim 1, wherein the threshold level is associated with the monitored data transaction calls exhibiting characteristics indicative of a server-side problem or a user-side problem.

6. The system of claim 1, wherein the threshold level is associated with the monitored data transaction calls exhibiting characteristics indicative of a server-side problem or a user-side problem, and the processing circuit is to determine whether the characteristics are indicative of the server-side problem or are indicative of the user-side problem.

7. The system of claim 6, wherein the processing circuit is to determine whether the characteristics are indicative of the server-side problem or are indicative of the user-side problem.

8. The system of claim 1, wherein the notification is based on the processing circuit having determined whether the monitored data transaction calls are indicative of a server-side problem or are indicative of a user-side problem and the notification conveys of which side the monitored data transaction calls are indicative.

9. The system of claim 1, wherein the characteristics are indicative of a problem associated with at least one or a combination of: call jitter, dropped data packets, and network connectivity.

10. The system of claim 1, wherein the processing circuit is to determine a threat level based on a plurality of conditions of the security policy being satisfied by the monitored data transaction calls.

11. The system of claim 10, wherein the plurality of conditions are associated with or include at least two of the following: a condition that is satisfied by a frequency of data transactions exceeding a threshold indicated in the security policy; a condition that is satisfied by a size of a data transaction exceeding a threshold transaction size in the security policy; a condition that is satisfied by exceeding a daily data transfer limit indicated in the security policy; a condition that is satisfied by a frequency of data transactions surpassing a stored average for the user account by a threshold indicated in the security policy; a condition that is satisfied by detecting a user logged in to the at least one VOIP server from an IP address outside of an IP address range specified by the security policy; and a condition that is satisfied by a number of failed login attempts exceeding a limit indicated in the security policy.

12. The system of claim 1, wherein the processing circuit is configured to determine a threat level as a function of at least one or a combination of the following: sensitivity level of files/folders that are accessed; a direction of the data transaction calls; and an IP location of a user initiating the data transaction calls.

13. The system of claim 1, wherein the processing circuit is further configured to, responsive to a threat level exceeding a second threshold level indicated in the security policy, perform one or more automated tasks to prevent unauthorized access to the at least one VOIP server.

14. The system of claim 1, wherein the processing circuit is to:
provide or communicate via an internet based graphical user interface (GUI); and
modify the security policy in response to user input via the GUI.

15. A system comprising:
a server to provide a plurality of data transaction services, including Voice-over-Internet Protocol (VOIP) services, on behalf of an account having an authorized user and to monitor data transactions that correspond to a user account having a security policy; and
computer circuitry, communicatively coupled or integrated with the server, to:
determine a possible call loop associated with the monitored data transactions as a function of the security policy,
determine, at least in part in response to a flag provided as part of one or more data packets of a data transaction, a threat level as an indication that the possible call loop corresponds to an actual call loop, and
send a notification to the authorized user of the user account, in response to the threat level exceeding a configurable threshold level that is set and indicated in the security policy of the user account, and prompt the authorized user to reply to the notification by conveying one of a plurality of different options for acting on the notification and thereby enabling the authorized user to take one of different possible actions in response to the notification, wherein the notification indicates that the possible call loop corresponds to an actual call loop.

16. The system of claim 15, wherein the notification is sent via a broadband network, including a world-wide web or Internet, to the authorized user having access to a graphical user interface (GUI).

17. A method comprising:
via a data-communications server, providing a plurality of data transaction services, including Voice-over-Internet Protocol (VOIP) services, on behalf of an account having an authorized user and monitoring data transactions that correspond to a user account having a security policy; and
via computer circuitry communicatively coupled or integrated with the data-communications server:
determining a possible call loop associated with the monitored data transactions based on an indication from a different server in communication with the data-communications server,
determining, in response to the possible call loop being determined, a threat level as an indication that the possible call loop corresponds to an actual call loop, and
sending a notification to the authorized user of the user account, in response to the threat level exceeding a configurable threshold level that is set and indicated in the security policy of the user account, indicates that the possible call loop corresponds to an actual call loop.

18. For use in a system having a server to provide a plurality of data transaction services, including Voice-over-Internet Protocol (VOIP) services, on behalf of an account having an authorized user and to monitor data transactions that correspond to a user account having a security policy, the system comprising:
computer circuitry, communicatively coupled or integrated with the server, to:
determine a possible call loop associated with the monitored data transactions in response to a flag as part of one or more data packets of a data transaction,
determine, in response to the possible call loop being determined, a threat level as a function of the security policy and as an indication that the possible call loop corresponds to an actual call loop, and
send a notification to the authorized user of the user account, in response to the threat level exceeding a configurable threshold level that is set by the authorized user via a user interface and with the threshold level being indicated in the security policy of the user account, and enable the authorized user to take one of different possible actions in response to the notification, wherein the notification indicates that the possible call loop corresponds to an actual call loop.

19. A system comprising:

a data communications server to provide to remote users respective various types of data communications services including data transaction calls, representing audio, associated with a user account linked to a security policy; and a processing circuit, communicatively-coupled to the data communications server, to:

monitor at least some of the data transaction calls and determine therefrom that characteristics of said at least some of the data transaction calls that said at least some of the data transaction calls are possibly unauthorized calls associated with a possible call loop;

determine, at least in part in response to a threat level as an indication of the possibly unauthorized calls and a flag provided as part of one or more data packets of a data transaction, a threat level that is set in the security policy that is determined by a plurality of conditions including one condition that is indicated in the security policy to which the user account is linked, wherein the threat level exceeding a threshold level is indicative of whether said at least some of the data transaction calls correspond to the actual call loop; and send a notification indicative of the threat level being exceeded, to an authorized user of the user account.

* * * * *